July 31, 1928.
R. STRINDBERG
1,678,924
UNDERCUTTING ATTACHMENT FOR SCREW MACHINES
Filed April 27, 1925
2 Sheets-Sheet 1
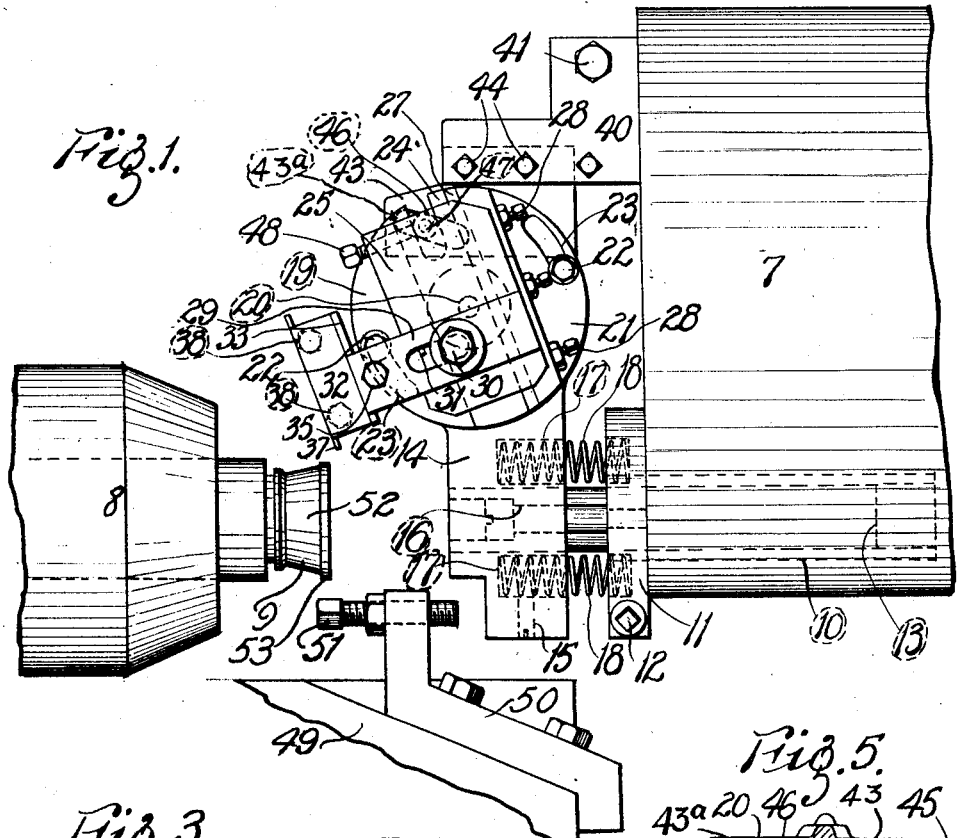
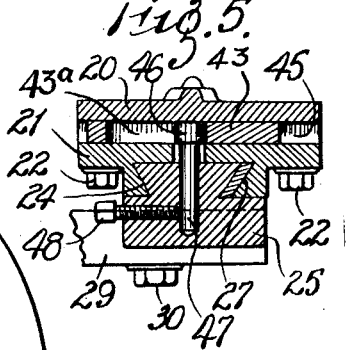
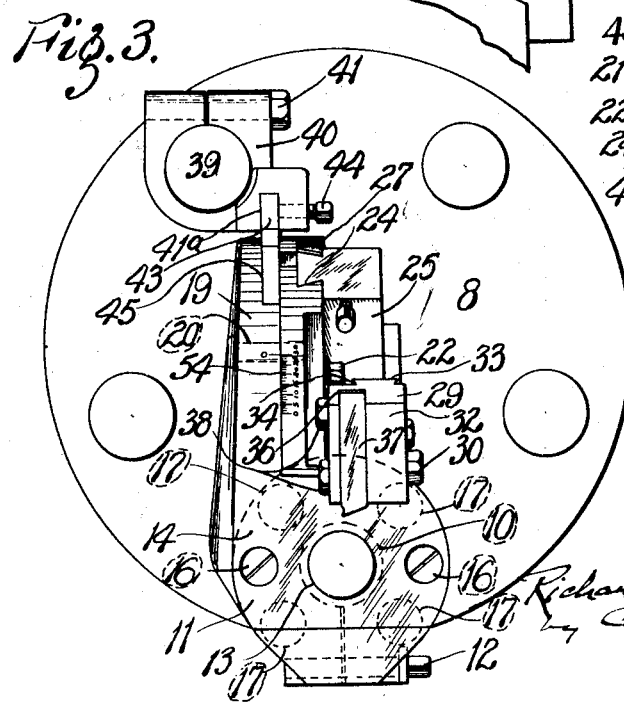
INVENTOR:
Richard Strindberg,
HIS ATTORNEYS.

July 31, 1928.

R. STRINDBERG 1,678,924

UNDERCUTTING ATTACHMENT FOR SCREW MACHINES

Filed April 27, 1925    2 Sheets-Sheet 2

INVENTOR:
Richard Strindberg,
by   Cavent Cavent,
HIS ATTORNEYS.

Patented July 31, 1928.

1,678,924

UNITED STATES PATENT OFFICE.

RICHARD STRINDBERG, OF CANTON, OHIO, ASSIGNOR TO THE TIMKEN ROLLER BEARING COMPANY, OF CANTON, OHIO, A CORPORATION OF OHIO.

UNDERCUTTING ATTACHMENT FOR SCREW MACHINES.

Application filed April 27, 1925. Serial No. 25,999.

This invention relates to special cutting tools adapted to be attached to metal working machines, such, for instance, as automatic lathes or screw machines, for the purpose of performing some special function upon the work. One of the principal objects of the present invention is to devise a cutting tool adapted, when attached to such machine, to perform an under-cutting operation upon the rotating work. Another object is to enable the tool to be readily attached to and removed from automatic lathes of the ordinary type which can be engaged with and disengaged from the work at proper time intervals by the operating parts of said lathes. Another object is to provide an adjustment whereby the angle of the undercut surface formed by the undercutting tool may be varied.

The invention consists principally in the improved undercutting tool hereinafter shown and described; and it also consists in the parts and in the combinations and arrangements of parts hereinafter described and claimed.

In the accompanying drawing, which forms part of this specification, and wherein like symbols refer to like parts wherever they occur.

Fig. 1 is a side elevation of a portion of an automatic screw machine provided with an undercutting tool embodying my invention; the tool being shown disengaged from the work;

Fig. 3 is an end view of the undercutting tool and the tool turret which supports said tool;

Fig. 5 is a cross-section through the tool on the line 5—5 in Fig. 2; and

Figure 2:
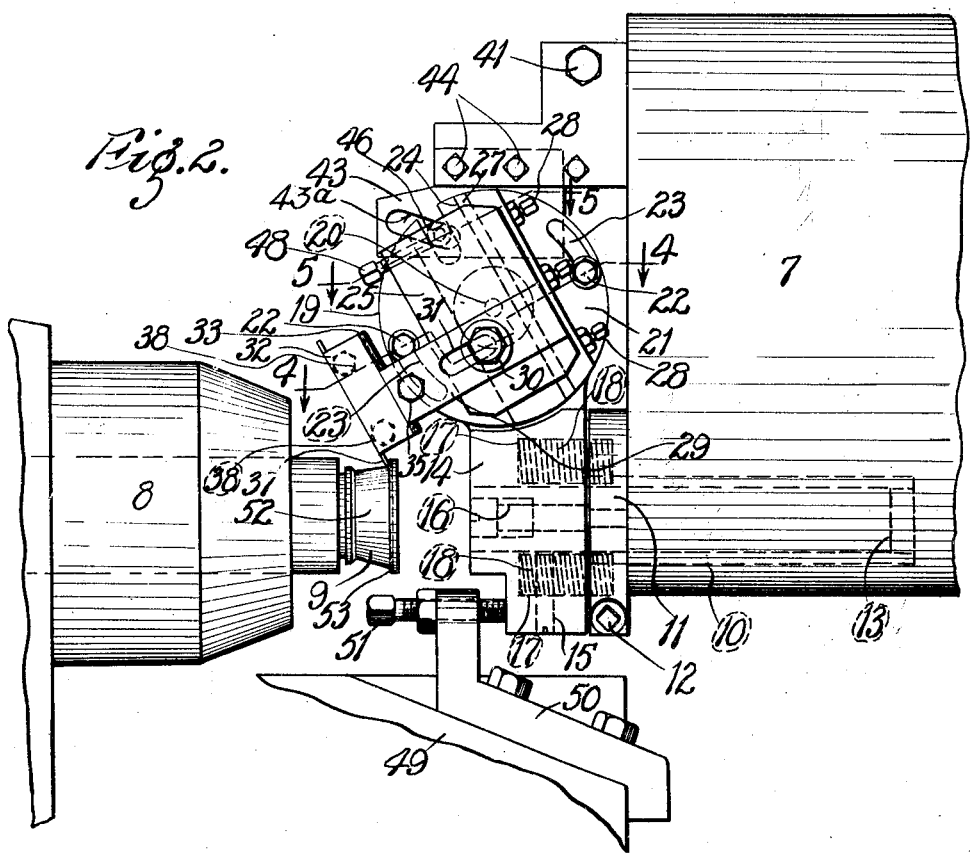
Fig. 2 is a similar view showing the tool in engagement with the work.
Figures 4, 6:
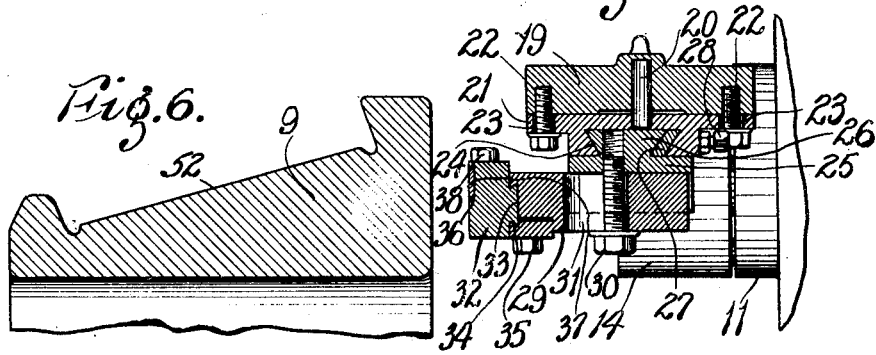
Fig. 4 is a cross-section through the tool on the line 4—4 in Fig. 2.
Fig. 6 is a longitudinal cross-section through the completed article on an enlarged scale, showing the cross-sectional shape of the undercut rib.

Referring to the accompanying drawings, an undercutting tool embodying my invention is shown in connection with a metal working machine of the automatic lathe or screw machine type. Said machine comprises a longitudinally reciprocating tool head or turret 7, a stock or work holding chuck or spindle 8 adapted to support and rotate the work 9 that is engaged by the various shaping and forming tools (not shown). This construction of screw machine is of well-known construction and it is considered unnecessary to illustrate it in detail.

A bushing 10 has a press fit in a horizontal bore at one of the tool stations of the tool head or turret 7 of the screw machine and projects a suitable distance beyond the front face of said turret. Sleeved on the projecting front end portion of the bushing 10 is a split stop ring 11, which is rigidly secured in position by means of a clamping screw 12. Slidably mounted in the bushing 10 is a cylindrical pilot 13 which projects a suitable distance beyond the front face of the stationary stop ring 11, in axial alinement with the work spindle 8. Mounted on the projecting front end portion of the pilot 13 is an upstanding support or bracket 14 which is fixedly secured to the slidably supported pilot 13 by means of set-screws 15 and is thus adapted to move with said pilot towards and away from said stop ring. Screws 16 extend through horizontal holes provided therefor in the bracket 14 and are threaded into the stop ring 11 on opposite sides. The screws 16 serve to hold the bracket 14 in an upright position, while their head portions function as stops for limiting the outward sliding movement of said bracket. The opposing faces of the bracket and the stop ring are provided with a series of circumferentially spaced oppositely disposed recesses 17 adapted to receive coil springs 18. The springs 18 normally tend to force the slidably supported bracket 14 away from the stop ring 11, which movement is restricted by the heads of the screws 16, that prevent rotary movement of said bracket.

The upper portion of the bracket 14 is provided with an enlarged circular head 19 having a pin 20 projecting horizontally from one side thereof. Swiveled on this pin is a member 21 which is secured in position by means of cap screws 22 which extend through arcuate slots 23 in said member and are threaded into said head. The length of these slots is such that they permit an oscillatory or rocking movement of the swivel member 21 preferably through an angle of about 30 degrees.

Slidably mounted in a forwardly inclined dove-tail slide-way 24 formed on the front face of the swivel member 21 is a slide-block 25 having a dove-tail rib 26 slidably engaged with said dove-tail groove or way 24. The slideway 24 is disposed at an oblique angle with relation to the longitudinal axis of the rotating work and is preferably provided with a gib 27 and adjusting screws 28 for taking up wear or looseness between the rib 26 and slideway 24. A tool-holder 29 is removably secured to the front face of the slide-block by means of a screw 30 which projects through an elongated slot 31 in said tool-holder and is threaded into said slide. The elongated slot 31 in the tool-holder 29 extends at right angles to the slideway 24 in the swivel member 21, thereby permitting adjustment of said tool-holder in directions transverse to the direction in which the slide-block 25 is adjusted. A cutter-block 32 has a dove-tail rib 33 slidably arranged in a dove-tail slideway 34 formed in the head portion of the tool-holder 29. The groove or slideway 34 extends parallel to the slideway 24 in the swivel member 21 and is slit and provided with a suitable clamping screw 35, whereby said cutter-block may be locked in the desired position of its sliding movement. The front face of the cutter-block 32 is provided with a dove-tail slideway 36 which extends parallel to the slideway 34 in the tool-holder 29 and is adapted to slidably support a cutter 37 whose lower end is formed with a cutting edge. This cutter may be adjusted longitudinally of the slideway towards and away from the work and then clamped in the desired adjusted position by means of a clamp screw 38.

Sleeved on a tool spindle 39 located in the upper rear station of the turret head is a split cam-holder 40 which is clamped to the tool spindle by means of a clamping screw 41 which extends through the split portions of said cam-holder. The cam-holder 40 is provided on its under side with a channel 41ª adapted to receive a cam plate 43. This plate is adapted to be adjusted longitudinally of the channel and is held in the desired position of adjustment by set screws 44. The cam plate extends below the cam-holder 40 into a channel 45 located between the opposing faces of the circular head 19 of the bracket 14, and the swivel 21, and thus serves as a guide for these members.

The cam plate 43 is provided with a rearwardly and downwardly inclined cam-slot 43ª extending horizontally therethrough and adapted to receive a roller 46 journaled on the outer end of a horizontal pin 47 which is mounted in a hole provided therefor in the slide-block 25 and is held therein by means of a suitable set-screw 48. Mounted on the main frame 49 of the screw machine is a stop bracket 50 having an upstanding portion located in front of the bracket member 14 and provided with an adjustable stop screw 51 adapted to cooperate with the opposing surface of said bracket member.

As shown in Figs. 1 and 2 of the drawings, the outer end of the stock 9 has been shaped by suitable forming tools to form an inner roller bearing cone 52 having a circumferential rib 53 at its outer end, such cone being shown completed except for the operations of undercutting said rib and the removal of the cone from the stock. In setting up the undercutting tool, the desired angle of undercut is obtained by rotating the swivel member 21 to swing the cutter 37 to the desired angular position. This adjustment is facilitated by graduations 54 on the edge of the swivel member 21 which cooperate with a zero mark on the adjacent end face of the circular head 19 of the bracket 14. The cutter 37 is then adjusted to the work by adjusting the cutter-block 32 in the tool-holder 29, and by adjusting said tool-holder on the swivel member 21.

In its normal or open position, as shown in Fig. 1, the turret 7 is moved to the right and the bracket 14 is forced away from the stop ring 11 by the pressure of the springs 18. This sliding movement of the bracket 14 causes the cam roller 46 carried by the slide-block 25 to move to the left in the cam slot 43ª thereby causing said slide-block to move upward in an oblique direction in the slideway 24 of the swivel member 21 and lift the cutter clear of the work. In the undercutting operation, as shown in Fig. 2, the turret 7 advances towards the work with the cutter 37 in its raised position until the bracket 14 abuts against the adjustable stop screw 51 supported on the bracket 50 that is rigidly secured to the frame 49 of the machine. Further forward movement of the tool turret 7 causes the cam plate 43 attached thereto to travel forward, whereby the inclined cam slot 43ª therein forces the cam roller 46, together with the slide-block 25 on which said roller is mounted, to move downwardly. This downward movement of the slide-block 25 causes the cutter carried thereby to move downwardly into engagement with the rotating work and perform the operation of undercutting the face of the rib or shoulder thereon. After completing the cut, the bracket 14 remains stationary until the rearward movement of the inclined cam-slot causes the cutter to lift off the work, after which said bracket, together with the parts supported thereon, moves away from the work to permit further operations to be performed thereon.

Obviously the hereinbefore described arrangement admits of considerable modification without departing from the invention; therefore I do not wish to be limited to the precise arrangement shown and described.

What I claim is:

1. In a metal working machine comprising a rotating work spindle and a reciprocating tool turret movable longitudinally thereof, the combination with an undercutting tool comprising a spring-pressed bracket slidably mounted on said turret for movement longitudinally thereof, a member swiveled to said bracket, a slide block mounted on the swivel member for sliding movement in a plane disposed at an oblique angle with relation to the spindle axis, a tool holder adjustably secured to said slide block, a cutting tool adjustably secured to said tool holder, and means carried by the tool turret and operatively engaging said slide block for moving the cutting tool into and out of engagement with the work.

2. In a metal working machine comprising a rotating work spindle and a reciprocating turret movable longitudinally thereof, the combination with an attachment comprising a pilot mounted on said turret for movement therewith and for longitudinal sliding movement independently thereof, a bracket fixed to said pilot in front of said turret, a spring normally tending to move said bracket away from said turret, an adjustable stop for limiting the sliding movement of said bracket away from said turret, a stop on said machine for arresting the forward movement of said bracket during the forward travel of said turret to cause the turret to move towards said bracket, a tool mounted on said bracket for sliding movement at an angle to the axis of the work spindle, and means carried by said turret and operatively connected with said tool to slide the same into and out of engagement with the work during the independent sliding movement of said bracket.

3. In a metal working machine comprising a rotating work spindle and a reciprocating turret movable longitudinally thereof, the combination with an attachment comprising a bracket mounted on said turret for movement therewith and for longitudinal sliding movement independently thereof, a member secured to said bracket, a block supported on said member for sliding movement at an angle to the spindle axis, a tool holder adjustably secured to said block, a tool adjustably secured to said tool holder, means for adjusting the supporting member for the slide block to vary the angular position of said block, and means carried by said tool turret and operatively connected with said tool block for actuating the same to move the tool into and out of engagement with the work during the independent sliding movement of said bracket.

4. In a metal working machine comprising a rotating work spindle and a reciprocating tool turret movable longitudinally thereof, the combination with an undercutting tool comprising a bracket mounted in front of said turret for movement therewith and for the longitudinal sliding movement relative thereto, a tool block supported on said bracket for sliding movement at an angle to the spindle axis, a tool mounted on said block, and a cam slot-and-pin connection between said turret and said block, said connection being operated by the relative sliding movement of said turret and said bracket to actuate said slide block to move the tool thereon into and out of engagement with the work.

5. In a metal working machine comprising a rotating work spindle and a reciprocating tool turret movable longitudinally thereof, the combination with an undercutting tool comprising a bracket mounted in front of said turret for movement therewith and for the longitudinal sliding movement relative thereto, a tool block supported on said bracket for sliding movement at an angle to the spindle axis, a tool mounted on said block, a spring normally tending to move said bracket away from said turret, a stop on said machine for arresting the forward movement of said bracket during the forward travel of said turret to cause the turret to move towards said bracket, and a cam slot-and-pin connection between said turret and said block and operated by the relative sliding movement of said turret and said bracket to actuate said slide block to move the tool thereon into and out of engagement with the work.

Signed at Canton, Ohio, this 21st day of April, 1925.

RICHARD STRINDBERG.